United States Patent
Li et al.

(10) Patent No.: US 7,668,102 B2
(45) Date of Patent: Feb. 23, 2010

(54) TECHNIQUES TO MANAGE RETRANSMISSIONS IN A WIRELESS NETWORK

(75) Inventors: Qinghua Li, Sunnyvale, CA (US); Minnie Ho, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 715 days.

(21) Appl. No.: 11/011,208

(22) Filed: Dec. 13, 2004

(65) Prior Publication Data

US 2006/0126513 A1 Jun. 15, 2006

(51) Int. Cl.
*H04L 1/00* (2006.01)

(52) U.S. Cl. .......... 370/236; 370/338; 370/230

(58) Field of Classification Search .......... 370/334, 370/315, 506, 328, 230, 338, 469, 394, 403; 455/132, 63.1
See application file for complete search history.

(56) References Cited

U.S. PATENT DOCUMENTS

| | | | | |
|---|---|---|---|---|
| 5,987,033 A * | 11/1999 | Boer et al. | ............ | 370/445 |
| 6,272,140 B1 * | 8/2001 | LaRowe et al. | ............ | 370/403 |
| 6,285,665 B1 * | 9/2001 | Chuah | ............ | 370/319 |
| 6,744,766 B2 * | 6/2004 | Alapuranen | ............ | 370/394 |
| 6,771,659 B1 * | 8/2004 | Parantainen et al. | ............ | 370/466 |
| 6,891,810 B2 * | 5/2005 | Struhsaker et al. | ............ | 370/294 |
| 6,999,432 B2 * | 2/2006 | Zhang et al. | ............ | 370/328 |
| 7,054,296 B1 * | 5/2006 | Sorrells et al. | ............ | 370/338 |
| 7,113,498 B2 * | 9/2006 | Bajic | ............ | 370/338 |
| 7,126,926 B1 * | 10/2006 | Bjorklund et al. | ............ | 370/328 |
| 7,206,297 B2 * | 4/2007 | Backes | ............ | 370/328 |
| 7,206,332 B2 * | 4/2007 | Kwan et al. | ............ | 375/140 |
| 7,295,119 B2 * | 11/2007 | Rappaport et al. | ............ | 340/572.4 |
| 7,321,599 B1 * | 1/2008 | Yen et al. | ............ | 370/466 |
| 7,389,096 B2 * | 6/2008 | Li | ............ | 455/278.1 |
| 7,519,030 B2 * | 4/2009 | Cimini et al. | ............ | 370/338 |
| 2003/0067890 A1 * | 4/2003 | Goel et al. | ............ | 370/310.1 |
| 2003/0128681 A1 * | 7/2003 | Rauschmayer | ............ | 370/338 |
| 2003/0152058 A1 | 8/2003 | Cimini et al. | | |
| 2004/0058420 A1 | 3/2004 | Noguchi et al. | | |
| 2004/0062273 A1 | 4/2004 | Frank et al. | | |
| 2004/0141523 A1 * | 7/2004 | Bhushan et al. | ............ | 370/469 |
| 2004/0184437 A1 | 9/2004 | Lee et al. | | |
| 2005/0002327 A1 * | 1/2005 | Li | ............ | 370/210 |
| 2005/0094632 A1 * | 5/2005 | Hebsgaard et al. | ............ | 370/389 |
| 2005/0152314 A1 * | 7/2005 | Sun et al. | ............ | 370/334 |

(Continued)

FOREIGN PATENT DOCUMENTS

EP 1735932 12/2006

(Continued)

OTHER PUBLICATIONS

Wilson, James M., "The Next Generation of Wireless LAN Emerges with 802.11n", Technology@Intel Magazine, Aug. 2004, pp. 1-8, Retrieved from the Internet on Mar. 29, 2006: <intel.com/technology/magazine/communications/wi08041.pdf>.

(Continued)

*Primary Examiner*—Thong H Vu
(74) *Attorney, Agent, or Firm*—Kacvinsky LLC

(57) ABSTRACT

Method and apparatus to manage retransmissions in a wireless network are described.

24 Claims, 4 Drawing Sheets

U.S. PATENT DOCUMENTS

| | | | |
|---|---|---|---|
| 2005/0180324 A1* | 8/2005 | Niemela et al. | 370/230 |
| 2005/0186958 A1* | 8/2005 | Hansen et al. | 455/426.2 |
| 2005/0255815 A1* | 11/2005 | Hammerschmidt et al. | 455/132 |
| 2005/0286440 A1* | 12/2005 | Strutt et al. | 370/253 |
| 2006/0034233 A1* | 2/2006 | Strutt et al. | 370/338 |
| 2006/0050742 A1* | 3/2006 | Grandhi et al. | 370/506 |
| 2006/0215592 A1* | 9/2006 | Tomoe et al. | 370/315 |
| 2006/0229017 A1* | 10/2006 | Larsson et al. | 455/63.1 |
| 2007/0081513 A1* | 4/2007 | Torsner | 370/349 |

FOREIGN PATENT DOCUMENTS

| | | |
|---|---|---|
| WO | 2005/114915 | 12/2005 |
| WO | WO 2005/114915 A2 | 12/2005 |

OTHER PUBLICATIONS

PCT International Search Report, International Application No. PCT/US2005/044773, Date of Completion: Mar. 30, 2006, Date of Mailing: Apr. 19, 2006, pp. 1-5.

* cited by examiner

TECHNIQUES TO MANAGE RETRANSMISSIONS IN A WIRELESS NETWORK

BACKGROUND

In a wireless communication system, wireless communication devices may communicate information using radio frequency (RF) signals. Some wireless communication devices may acknowledge the receipt of information by sending an acknowledgement message. Techniques to improve control and management of acknowledgement messages may improve transfer efficiency and overall system performance.

DETAILED DESCRIPTION

Figure 1:
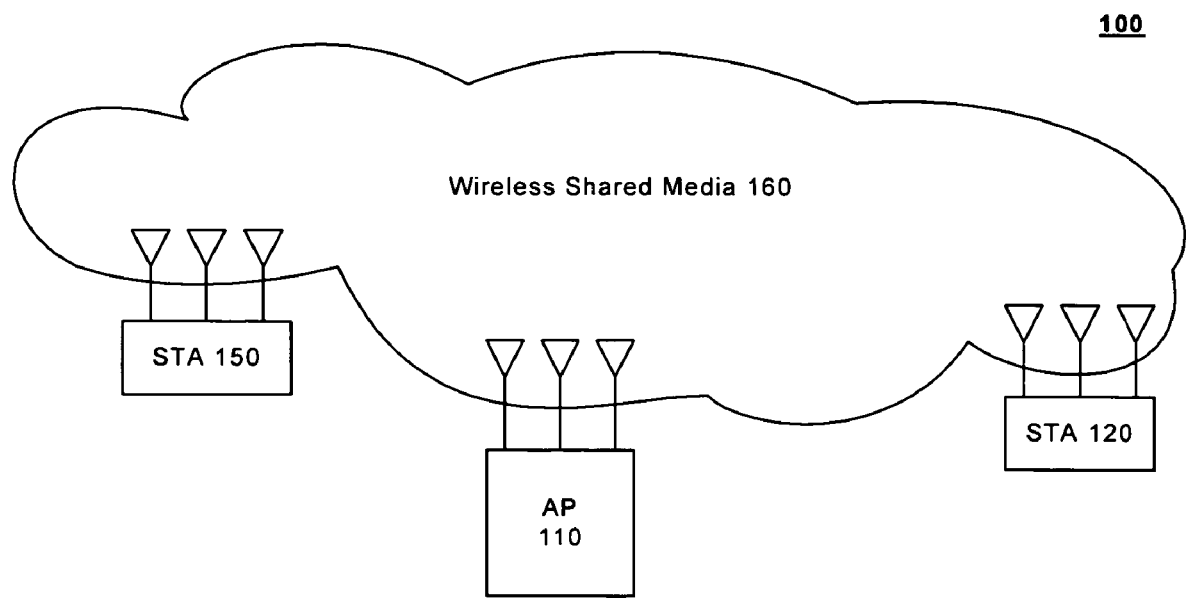
FIG. 1 illustrates a block diagram of a system 100.

FIG. 1 illustrates a block diagram of a system 100. System 100 may comprise, for example, a communication system having multiple nodes. A node may comprise any physical or logical entity having a unique address in system 100. Examples of a node may include, but are not necessarily limited to, a computer, server, workstation, laptop, ultra-laptop, handheld computer, telephone, cellular telephone, personal digital assistant (PDA), router, switch, bridge, hub, gateway, wireless access point, and so forth. The unique address may comprise, for example, a network address such as an Internet Protocol (IP) address, a device address such as a Media Access Control (MAC) address, and so forth. The embodiments are not limited in this context.

The nodes of system 100 may be arranged to communicate different types of information, such as media information and control information. Media information may refer to any data representing content meant for a user, such as voice information, video information, audio information, text information, alphanumeric symbols, graphics, images, and so forth. Control information may refer to any data representing commands, instructions or control words meant for an automated system. For example, control information may be used to route media information through a system, or instruct a node to process the media information in a predetermined manner.

The nodes of system 100 may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. For example, system 100 may operate in accordance with the IEEE 802.11 wireless local area network (WLAN) series of standard protocols, such as the IEEE 802.11n, 2004 proposed standard ("802.11n Proposed Standard"). In another example, system 100 may operate in accordance with the IEEE 802.16 and 802.20 series of standard protocols. The embodiments are not limited in this context.

Referring again to FIG. 1, system 100 may comprise a wireless communication system. Wireless communication system 100 may include one or more wireless nodes arranged to communicate information over one or more types of wireless communication media. An example of a wireless communication media may include portions of a wireless spectrum, such as the RF spectrum. The wireless nodes may include components and interfaces suitable for communicating information signals over the designated wireless spectrum, such as one or more antennas, wireless transmitters/receivers ("transceivers"), amplifiers, filters, control logic, and so forth. The embodiments are not limited in this context.

In one embodiment, system 100 may include an access point (AP) 110, a station (STA) 120, and a STA 150, all arranged to communicate information signals using wireless shared media 160. Information signals may include any type of signal encoded with information, such as media and/or control information. Although FIG. 1 is shown with a limited number of nodes in a certain topology, it may be appreciated that system 100 may include more or less nodes in any type of topology as desired for a given implementation. The embodiments are not limited in this context.

In one embodiment, system 100 may comprise a wireless communication system operating in accordance with, for example, the IEEE 802.11 series of protocols. System 100 may comprise AP 110. AP 110 may comprise a wireless access point for a network, such as a WLAN. In one embodiment, for example, AP 110 may be implemented as a high throughput (HT) wireless device arranged to operate in accordance with the IEEE-802.11n Proposed Standard. AP 110 may include a MIMO system having multiple transceivers and multiple antennas. The embodiments are not limited in this context.

In one embodiment, system 100 may comprise STA 120 and STA 150. STA 120 and 150 may each be implemented as, for example, a wireless communication device, such as mobile or cellular telephone, a computer or laptop equipped with a wireless access card, a handheld device such as a wireless PDA, an integrated cellular telephone/PDA, and so forth. The embodiments are not limited in this context.

In one embodiment, for example, STA 120 and STA 150 may be implemented as HT wireless devices arranged to operate in accordance with the IEEE-802.11n Proposed Standard. STA 120 and STA 150 may each include a MIMO system having at least two transceivers and two antennas. The MIMO system, however, may have any number of transceivers and antennas, and the embodiments are not limited in this context.

In general operation, the nodes of system 100 may operate in multiple operating modes. For example, STA 120, STA 150 and AP 110 may operate in at least one of the following operating modes: a single-input-single-output (SISO) mode, a multiple-input-single-output (MISO) mode, a single-input-multiple-output (SIMO) mode, and/or in a MIMO mode. In a SISO operating mode, a single transmitter and a single receiver may be used to communicate information signals over a wireless shared medium 160. In a MISO operating mode, two or more transmitters may transmit information signals over wireless shared media 160, and information signals may be received from wireless shared media 160 by a single receiver of a MIMO system. In a SIMO operating mode, one transmitter and two or more receivers may be used to communicate information signals over wireless shared media. In a MIMO operating mode, two or more transmitters and two or more receivers may be used to communicate information signals over wireless shared media 160.

System 100 may be arranged to communicate information over wireless communications media between the various nodes, such as AP 110, STA 120 and STA 150. The information may be communicated using in the form of packets, with each packet comprising media information and/or control information. The media and/or control information may be represented using, for example, multiple Orthogonal Frequency Division Multiplexing (OFDM) symbols. A packet in this context may refer to any discrete set of information, including a unit, frame, cell, segment, fragment, and so forth. The packet may be of any size suitable for a given implementation. In one embodiment, for example, the packet may comprise a media access control protocol data unit (MPDU) as defined by the IEEE 802.11n Proposed Standard. The embodiments are not limited in this context.

In order to improve transfer efficiency, a transmitting device may transmit information in accordance with an aggregate exchange technique, such as defined by the IEEE 802.11n Proposed Standard. For example, multiple MPDUs may be aggregated into a single physical (PHY) protocol data unit (PPDU), as defined by the IEEE 802.11n Proposed Standard. The PPDU may include a block acknowledgement request (BAR). The BAR may indicate the end of a PPDU. When a receiving device receives the PPDU, it waits to receive the BAR. Once the BAR is received, the receiving device may acknowledge receipt of the PPDU using a block acknowledgement (ACK) in response to the BAR. In this manner, the transmitting device may not necessarily need to initiate a new transfer for every single MPDU, thereby potentially increasing transfer efficiency and throughput.

Existing aggregation techniques, however, may be unsatisfactory for a number of reasons. For example, a transmitting device such as AP 110 may transmit a PPDU to a receiving device, such as STA 120 and/or STA 150. For static channels, the shorter BAR at the end of the PPDU may be more reliably received than the longer MPDU. This may not be the case, however, for time varying channels using transmit beamforming, such as in a MIMO system, for example. The signal-to-noise-plus-interference ratio may decrease over time, since beamforming techniques typically do not monitor channel variations and adjust transmissions accordingly. As a result, the latter portion of a PPDU may be subject to increasing interference, and therefore the BAR may have a higher probability of being lost during the longer aggregations used by HT systems. If the receiving device receives the PPDU, but not the BAR, the receiving device will not send out the block ACK. If AP 110 does not receive the block ACK within a certain time interval, referred to herein as a "delay interval," AP 110 assumes the entire PPDU was not properly received and retransmits the entire PPDU. This may occur even though the receiving device may have properly received one or more of the MPDUs from the PPDU. Retransmitting properly received MPDUs may result in an unnecessary use of system resources, thereby reducing system performance and efficiency.

Some embodiments may solve this and other problems. In one embodiment, for example, AP 110, STA 120 and/or STA 150 may employ one or more techniques to manage retransmission of packets in a wireless network, such as system 100. For example, a PPDU may include information which can be used to estimate the transmission duration of a given PPDU. Examples of such information may include a length value, data rate, code rate, modulation constellation size, bandwidth, and so forth. In addition, an estimate of transmission duration for a given PPDU may be generated using various properties and characteristics of the system, such as received power levels for the PPDU, and so forth. The embodiments are not limited in this context.

Once the transmission duration for a given PPDU is estimated, the receiving device may use the estimate to determine when to generate a block ACK in the event a BAR is delayed or not received at all. The block ACK may include, for example, an individual acknowledgement value for each MPDU. Each individual acknowledgement value may be set to indicate whether a corresponding MPDU has been properly received. Instead of transmitting the entire PPDU, the transmitting device may retransmit only those MPDU not properly received by the receiving device. In this manner, system resources may be conserved by reducing or preventing the retransmission of MPDUs that have already been properly received.

Figure 2:
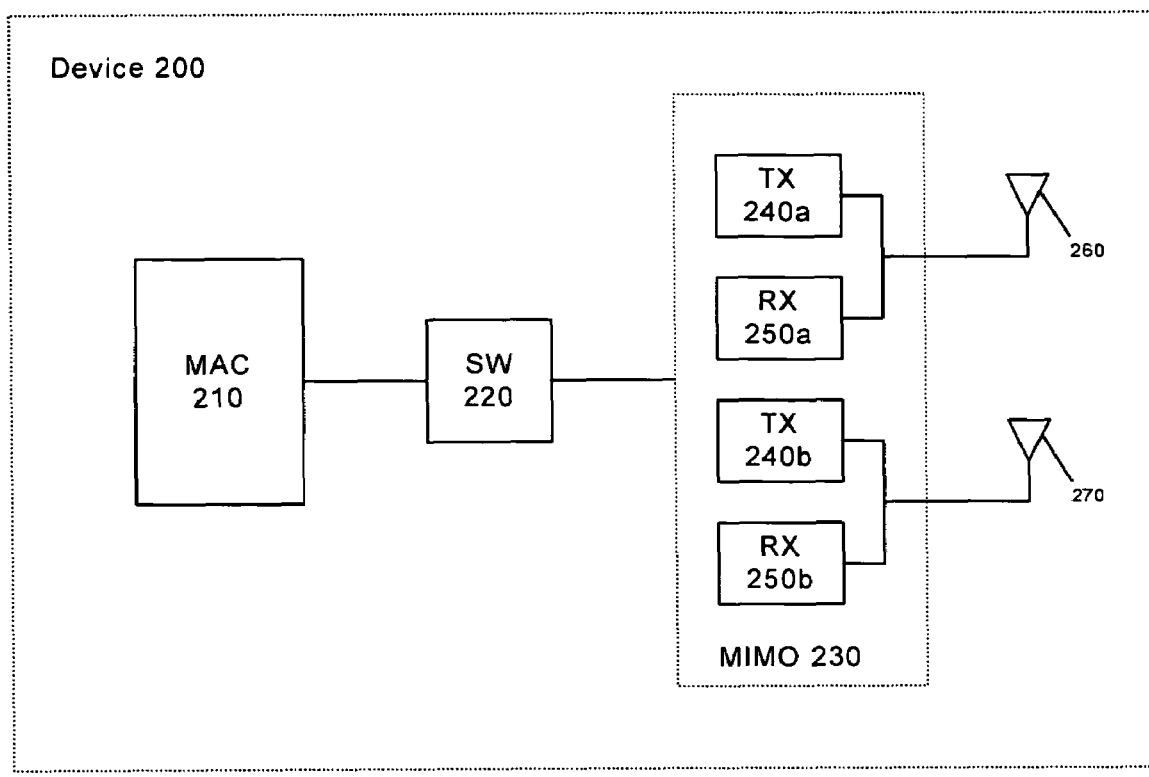
FIG. 2 illustrates a partial block diagram of a node 200.

FIG. 2 illustrates a partial block diagram of a node 200. Node 200 may be implemented as part of AP 110, STA 120 and/or STA 150 as described with reference to FIG. 1. As shown in FIG. 2, node 200 may comprise multiple elements, such as processor 210, switch (SW) 220, and a transceiver array 230. Some elements may be implemented using, for example, one or more circuits, components, registers, processors, software subroutines, or any combination thereof. Although FIG. 2 shows a limited number of elements, it can be appreciated that more or less elements may be used in node 200 as desired for a given implementation. The embodiments are not limited in this context.

In one embodiment, node 200 may include a transceiver array 230. Transceiver array 230 may be implemented as, for example, a MIMO system. MIMO system 230 may include two transmitters 240a and 240b, and two receivers 250a and 250b. Although MIMO system 230 is shown with a limited number of transmitters and receivers, it may be appreciated that MIMO system 230 may include any desired number of transmitters and receivers. The embodiments are not limited in this context.

In one embodiment, transmitters 240a-b and receivers 250a-b of MIMO system 230 may be implemented as OFDM transmitters and receivers. Transmitters 240a-b and receivers 250a-b may communicate data frames with other wireless devices. For example, when implemented as part of AP 110, transmitters 240a-b and receivers 250a-b may communicate data frames with STA 120 and STA 150. When implemented as part of STA 120 and/or STA 150, transmitters 240a-b and receivers 250a-b may communicate data frames with AP 110. The data frames may be modulated in accordance with a number of modulation schemes, to include Binary Phase Shift Keying (BPSK), Quadrature Phase-Shift Keying (QPSK), Quadrature Amplitude Modulation (QAM), 16-QAM, 64-QAM, and so forth. The embodiments are not limited in this context.

In one embodiment, transmitter 240a and receiver 250a may be operably coupled to an antenna 260, and transmitter 240b and receiver 250b may be operably coupled to antenna 270. Examples for antenna 260 and/or antenna 270 may include an internal antenna, an omni-directional antenna, a monopole antenna, a dipole antenna, an end fed antenna or a circularly polarized antenna, a micro-strip antenna, a diversity antenna, a dual antenna, an antenna array, and so forth. The embodiments are not limited in this context.

In one embodiment, node 200 may include SW 220. SW 220 may be connected to transceiver array 230. SW 220 may be used to switch transceiver array 230 between various operating modes, such as SISO, MISO, SIMO and MIMO, as previously described. The embodiments are not limited in this context.

In one embodiment, node 200 may include a processor 210. Processor 210 may be connected to SW 220 and/or transceiver array 230. Processor 210 may be implemented as a general purpose processor, such as a processor made by Intel® Corporation, for example. Processor 210 may also comprise a dedicated processor, such as a controller, microcontroller, embedded processor, a digital signal processor (DSP), a network processor, an input/output (I/O) processor, and so forth. The embodiments are not limited in this context.

In one embodiment, processor 210 may include, or have access to, a memory unit (not shown). The memory unit may comprise any machine-readable media. Some examples of machine-readable media include, but are not necessarily limited to, read-only memory (ROM), random-access memory (RAM), dynamic RAM (DRAM), double-data-rate DRAM (DDRAM), synchronous RAM (SRAM), programmable ROM, erasable programmable ROM, electronically erasable programmable ROM, flash memory, a polymer memory such as ferroelectric polymer memory, an ovonic memory, magnetic disk (e.g., floppy disk and hard drive), optical disk (e.g., CD-ROM and DVD), and so forth. The embodiments are not limited in this context.

In one embodiment, for example, processor 210 may be arranged to perform MAC layer and/or PHY layer operations. For example, processor 210 may be implemented as a MAC processor. MAC 210 may be arranged to perform MAC layer processing operations. In addition, MAC 210 may be arranged to manage retransmissions in a wireless system operating in accordance with one or more protocols that use acknowledgements to confirm receipt of information, such as the IEEE 802.11 series of protocols, particularly the IEEE 802.11n Proposed Standard, for example. The embodiments, however, are not limited in this context.

The operations of node 200 in general, and MAC 210 in particular, may vary in accordance with whether node 200 is implemented as part of a transmitting device or a receiving device. This may be described in more detail with reference to FIGS. 3-4.

Figure 3:
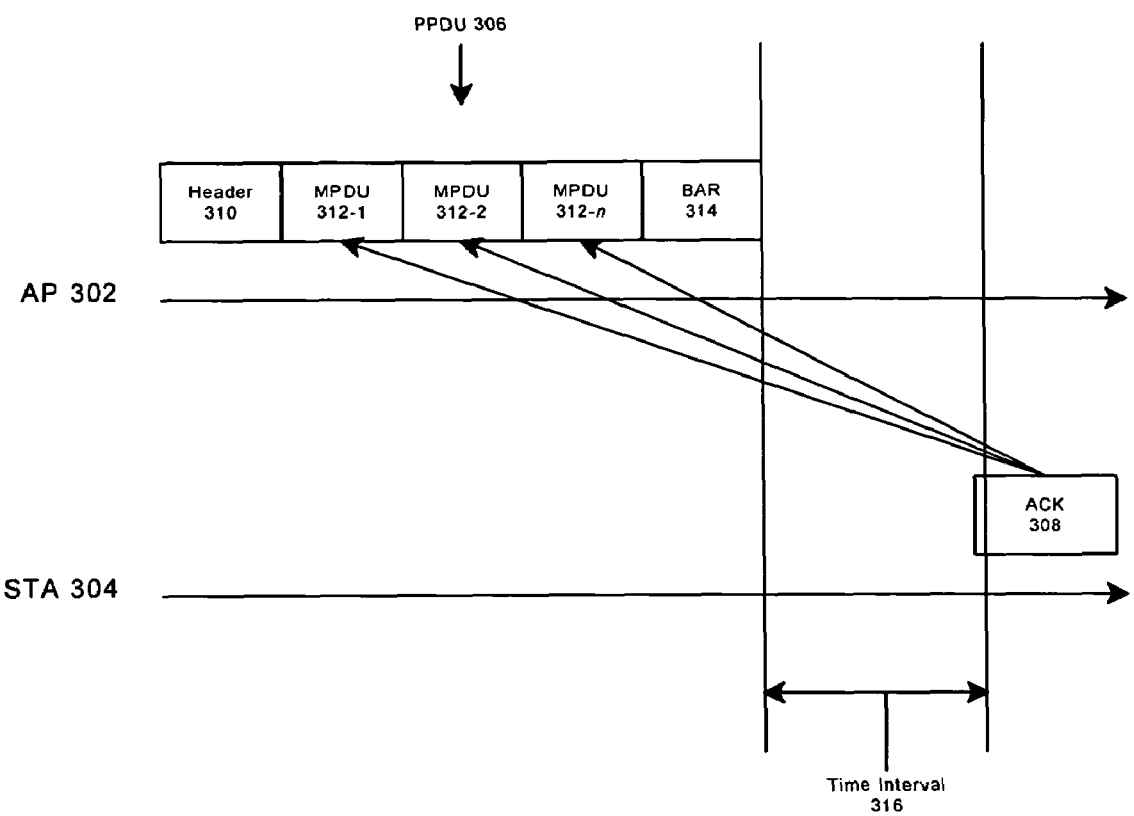
FIG. 3 illustrates a timing diagram 300.

FIG. 3 illustrates a timing diagram 300. Timing diagram 300 may illustrate the communication of information between an AP 302 and STA 304. AP 302 may be representative of, for example, AP 110. STA 304 may be representative of, for example, STA 120 and/or STA 150. Each of AP 302 and STA 304 may be implemented using node 200. The embodiments are not limited in this context.

On the transmit side, AP 302 may transmit or send information to STA 304. The information may include media and/or control information represented using, for example, multiple OFDM symbols. The information may be communicated using a PPDU 306. PPDU 306 may comprise, for example, a PPDU header 310 and a BAR 314. PPDU 306 may further comprise multiple MPDU 312-1-$n$, where n is any positive integer. The value of n may be set in accordance with a total aggregation size for PPDU 306 desired for a given implementation. The embodiments are not limited in this context.

Once AP 302 sends PPDU 306 to STA 304, AP 302 waits to receive a block ACK 308 from STA 304. Block ACK 308 may indicate whether STA 304 has successfully received PPDU 306. More particularly, block ACK 308 may indicate which of MPDU 312-1-$n$ have been properly received by STA 304. Block ACK 308 may include individual acknowledgement values for each MPDU 312-1-$n$. MAC 210 of STA 304 may set each individual acknowledgement value to indicate whether a corresponding MPDU 312-1-$n$ has been properly received. For example, MAC 210 may set the individual acknowledgement value to one ("1") to indicate that the corresponding MPDU was properly received, and to zero ("0") to indicate that the corresponding MPDU was not properly received, or vice-versa. STA 304 may send block ACK 308 with the set individual acknowledgement values to AP 302 via transmitters 240$a$-$b$.

AP 302 may wait for block ACK 308 for a given delay interval. Once AP 302 sends PPDU 306 to STA 304, AP 302 may start a transmit timer to monitor when the delay interval is to expire. The delay interval may comprise any determined amount or interval of time, as represented by time interval 316. In one embodiment, for example, time interval 316 may comprise a short interframe spacing (SIFS) time as defined by the IEEE 802.11a specification, which is approximately 16 microseconds ($\mu$s). It is worthy to note, however, that a particular implementation of a SIFS time may have a variable duration depending upon, for example, an error tolerance range of a given standard. For example, the 802.11 MAC standards may allow for an error within +/−10% of a slot time. Further, the slot time for a given standard may vary as well. Accordingly, time interval 316 may vary according to a given implementation. The embodiments are not limited in this context.

If AP 302 fails to receive block ACK 308 within time interval 316, AP 302 assumes PPDU 306 has not been properly received by STA 304. Consequently, AP 302 may then retransmit the entire PPDU 306 to STA 304. AP 302 may continue such retransmission operations until a terminating event occurs. Examples of terminating events may include receiving block ACK 308 for PPDU 306, determining that a set number of retransmissions of PPDU 306 have occurred, receiving an explicit termination signal, and so forth. The embodiments are not limited in this context.

If AP 302 receives block ACK 308 within time interval 316, AP 302 may use block ACK 308 to determine whether AP 302 needs to retransmit any portion of PPDU 306 to STA 304. For example, AP 302 may use block ACK 308 to determine whether AP 302 needs to retransmit one or more MPDU 312-1-$n$ of PPDU 306 as indicated by the individual acknowledgement values embedded in block ACK 308. In this manner, AP 302 does not necessarily need to retransmit the entire PPDU 306, but rather limits retransmissions to only those MPDU 312-1-$n$ that have not been successfully received by STA 304.

On the receive side, STA 304 may begin receiving PPDU 306 via receivers 250$a$-$b$ of transceiver array 230. If STA 304 completely receives PPDU 306 as indicated by BAR 314 of PPDU 306 within time interval 316, MAC 210 of STA 304 may send block ACK 308 via transmitters 240$a$-$b$ of transceiver array 230 to AP 302. AP 302 may perform retransmission operations in accordance with block ACK 308 as previously described.

Given the increasing probability of interference and degradation of the received beam formed signal quality for longer aggregations, however, a case may arise where STA 304 may receive one or more MPDU 312-$n$ of PPDU 306, but not BAR 314 which may indicate the end of PPDU 306. If STA 304 does not receive BAR 314 of PPDU 306 within time interval 316, MAC 210 may be arranged to still send block ACK 308 via transmitters 240$a$-$b$ during time interval 316. By sending block ACK 308 even if STA 304 does not receive BAR 314, AP 302 may be prevented from unnecessarily retransmitting the entire PPDU 306.

In one embodiment, for example, STA 304 may be arranged to send block ACK 308 to AP 302 during time interval 316 even if STA 304 does not receive BAR 314 by monitoring time interval 316 using a receive timer. STA 304 may start the receive timer when receivers 250$a$-$b$ begin to receive PPDU 306. Before expiration of time interval 316 as indicated by the receive timer, MAC 210 of STA 304 may finish the CRC checks, which may be used to determine whether any of MPDU 312-1-$n$ have been properly received. MAC 210 may generate block ACK 308 to indicate which of MPDU 312-1-$n$ have been properly received. MAC 210 may set each individual acknowledgement value (e.g., a 1 or 0) to indicate whether a corresponding MPDU 312-1-*n* has been properly received. STA 304 may send block ACK 308 with the set individual acknowledgement values to AP 302 via transmitters 240*a-b* during time interval 316.

In one embodiment, for example, STA 304 may also be arranged to send block ACK 308 to AP 302 during time interval 316 even if STA 304 does not receive BAR 314 using a length value for PPDU 306. For example, STA 304 may estimate a transmission duration for PPDU 306. MAC 210 may start a receive timer to monitor the estimated time. Once the receive timer meets the estimate time for completely receiving PPDU 306, but before the expiration of time interval 316, MAC 210 of STA 304 may finish checking whether any of MPDU 312-1-*n* have been properly received. MAC 210 may generate block ACK 308 to indicate which of MPDU 312-1-*n* have been properly received. MAC 210 may set each individual acknowledgement value (e.g., a 1 or 0) to indicate whether a corresponding MPDU 312-1-*n* has been properly received. STA 304 may then send block ACK 308 with the set individual acknowledgement values to AP 302 via transmitters 240*a-b* during time interval 316.

Since the interval is counted from the end of PPDU 306, the end of PPDU 306 has to be estimated. This can be accomplished using a number of different techniques. For example, the transmission duration of PPDU 306 may be estimated using length and/or data rate information in header 310. In another example, the transmission duration of PPDU 306 may be estimated by monitoring the received power level of PPDU 306. When the current power level of PPDU 306 reduces to below a determined threshold power level, a termination for PPDU 306 may be declared. The embodiments are not limited in this context.

In one embodiment, block ACK 308 may include individual acknowledgement values for each MPDU 312-1-*n*. MAC 210 may also be arranged to generate block ACK 308, however, with a limited number of individual acknowledgement values. This may be desirable to reduce the amount of overhead incurred by block ACK 308. For example, block ACK 308 may include the individual acknowledgement values for only the MPDU 312-1-*n* that were properly received. AP 302 may assume that only the MPDU 312-1-*n* corresponding to the missing individual acknowledgement values need retransmission. Conversely, block ACK 308 may include the individual acknowledgement values for only the MPDU 312-1-*n* that were not properly received. AP 302 may retransmit the MPDU 312-1-*n* accordingly. The embodiments are not limited in this context.

Operations for the above embodiments may be further described with reference to the following figures and accompanying examples. Some of the figures may include programming logic. Although such figures presented herein may include a particular programming logic, it can be appreciated that the programming logic merely provides an example of how the general functionality described herein can be implemented. Further, the given programming logic does not necessarily have to be executed in the order presented unless otherwise indicated. In addition, the given programming logic may be implemented by a hardware element, a software element executed by a processor, or any combination thereof. The embodiments are not limited in this context.

Figure 4:
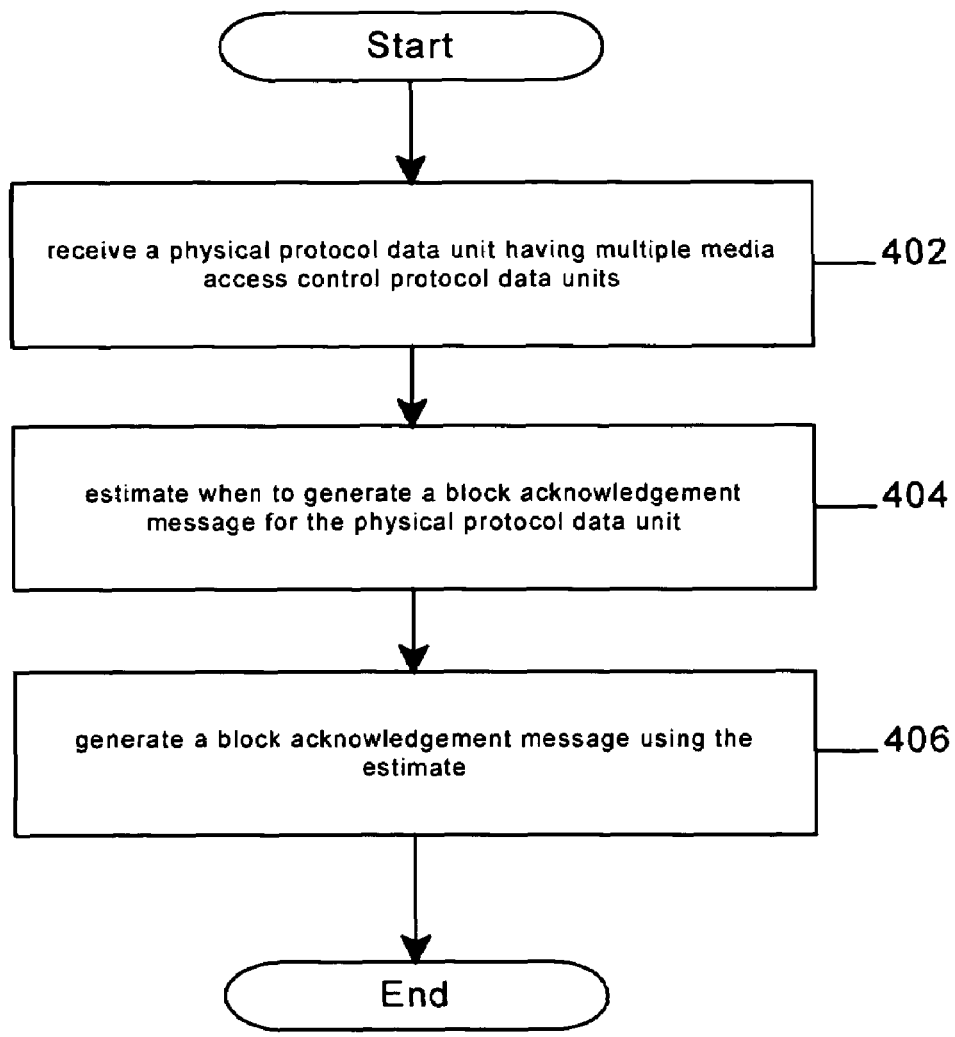
FIG. 4 illustrates a programming logic 400.

FIG. 4 illustrates a programming logic 400. Programming logic 400 may be representative of the operations executed by one or more systems described herein, such as node 200 as implemented as part of AP 302, for example. As shown in programming logic 400, a physical protocol data unit having multiple media access control protocol data units may be received at block 402. When to generate a block acknowledgement message for the physical protocol data unit may be estimated at block 404. A block acknowledgement message may be generated using the estimate at block 406.

In one embodiment, when to generate a block acknowledgement message may be estimated by retrieving a length value for the physical protocol data unit. The length value may be used to estimate when to generate said block acknowledgement message.

In one embodiment, when to generate a block acknowledgement message may be estimated by monitoring a first power level for the received physical protocol data unit. The first power level may be compared to a second power level. The estimate of when to generate the block acknowledgement message may be made in accordance with the comparison.

In one embodiment, the block acknowledgment message may include an individual acknowledgement value for each MPDU. Each individual acknowledgement value may indicate whether a corresponding media access control protocol data unit has been received.

In one embodiment, the block acknowledgement message may be sent. More particularly, the block acknowledgement message may be sent during a delay interval to resend the PPDU. The block acknowledgement message may be sent during the delay interval even if a block acknowledgement request is not received during the delay interval. If the block acknowledgement message is received during the delay interval, then the block acknowledgement message may be generated in response to the block acknowledgement request rather than the estimate.

In one embodiment, the block acknowledgement message may be estimated using the known delay interval. For example, the delay interval may be monitored. A determination may be made as to which MPDUs have been properly received. The block acknowledgement message may be generated. Each individual acknowledgement value in the block acknowledgement message may be set to indicate whether a corresponding MPDU has been received. The block acknowledgement message may be sent during the delay interval regardless if a block acknowledgement request is received during the delay interval.

In one embodiment, the block acknowledgement message may be received. One or more MPDUs may be resent or retransmitted in accordance with the block acknowledgement message.

It should be understood that the embodiments may be used in a variety of applications. As described above, the circuits and techniques disclosed herein may be used in many apparatuses such as transmitters and receivers of a radio system. Transmitters and/or receivers intended to be included within the scope of the embodiments may include, by way of example only, WLAN transmitters and/or receivers, MIMO transmitters-receivers system, two-way radio transmitters and/or receivers, digital system transmitters and/or receivers, analog system transmitters and/or receivers, cellular radiotelephone transmitters and/or receivers, and so forth. The embodiments are not limited in this context.

Types of WLAN transmitters and/or receivers intended to be within the scope of the embodiments may include, although are not limited to, transmitters and/or receivers for transmitting and/or receiving spread spectrum signals such as, for example, Frequency Hopping Spread Spectrum (FHSS), Direct Sequence Spread Spectrum (DSSS) OFDM transmitters and/or receivers, and so forth. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
a transceiver array having multiple antennas and multiple receivers, said receivers to receive a physical protocol data unit including a length value of the physical protocol data unit and having multiple media access control protocol data units; and
a media access controller to connect to said transceiver array, said media access controller to use said length value to estimate when to generate a block acknowledgement message, said block acknowledgment message to include an individual acknowledgement value for each media access control protocol data unit, with each individual acknowledgement value to indicate whether a corresponding media access control protocol data unit has been received.

2. The apparatus of claim 1, wherein said media access controller is to monitor a first power level for said received physical protocol data unit, compare said power level to a second power level, and estimate when to generate said block acknowledgement message in accordance with said comparison.

3. The apparatus of claim 1, wherein said transceiver away includes at least one transmitter, said media access controller to send said block acknowledgement message using said transmitter.

4. The apparatus of claim 3, wherein said media access controller is to send said block acknowledgement message during a delay interval, said delay interval to represent a time interval to resend said physical protocol data unit.

5. The apparatus of claim 4, wherein said delay interval comprises a short interframe spacing time.

6. The apparatus of claim 4, wherein said physical protocol data unit includes a block acknowledgement request, said media access controller to send said block acknowledgement message during said delay interval even if said receivers fail to receive said block acknowledgement request.

7. The apparatus of claim 1, wherein each media access control protocol data unit includes orthogonal frequency division multiplexing symbols.

8. A system, comprising:
an access point to send a physical protocol data unit including a length value of the physical protocol data unit and having multiple media access control protocol data units;
a station to receive said packet, said station comprising:
a transceiver array having multiple antennas and multiple receivers, said receivers to receive said physical protocol data unit; and
a media access controller to connect to said transceiver array, said media access controller to use said length value to estimate when to generate a block acknowledgement message, said block acknowledgment message to include an individual acknowledgement value for each media access control protocol data unit, with each individual acknowledgement value to indicate whether a corresponding media access control protocol data unit has been received.

9. The system of claim 8, wherein said media access controller is to monitor a first power level for said received physical protocol data unit, compare said power level to a second power level, and estimate when to generate said block acknowledgement message in accordance with said comparison.

10. The system of claim 8, wherein said transceiver away includes at least one transmitter, said media access controller to send said block acknowledgement message using said transmitter.

11. The system of claim 10, wherein said media access controller is to send said block acknowledgement message during a delay interval, said delay interval to represent a time interval to resend said physical protocol data unit.

12. The system of claim 11, wherein said delay interval comprises a short interframe spacing time.

13. The system of claim 12, wherein said physical protocol data unit includes a block acknowledgement request, said media access controller to send said block acknowledgement message during said delay interval even if said receivers fail to receive said block acknowledgement request.

14. The system of claim 8, wherein each media access control protocol data unit includes orthogonal frequency division multiplexing symbols.

15. A method, comprising:
receiving a physical protocol data unit including a length value of the physical protocol data unit and having multiple media access control protocol data units;
estimating when to generate a block acknowledgement message for said physical protocol data unit using said length value; and
generating a block acknowledgement message using said estimate, said block acknowledgment message to include an individual acknowledgement value for each media access control protocol data unit, with each individual acknowledgement value to indicate whether a corresponding media access control protocol data unit has been received.

16. The method of claim 15, wherein said estimating comprises:
monitoring a first power level for said received physical protocol data unit;
comparing said first power level to a second power level; and
estimating when to generate said block acknowledgement message in accordance with said comparison.

17. The method of claim 15, further comprising sending said block acknowledgement message during a delay interval to resend said physical protocol data unit.

18. The method of claim 15, further comprising sending said block acknowledgement message during a delay interval to resend said physical protocol data unit if a block acknowledgement request is not received during said delay interval.

19. The method of claim 18, further comprising:
receiving said block acknowledgement message; and
resending at least one of said media access control protocol data units in accordance with said block acknowledgement message.

20. An article, comprising:
a storage medium;
said storage medium including stored instructions that, when executed by a processor, are operable to receive a physical protocol data unit including a length value of the physical protocol data unit and having multiple media access control protocol data units, estimate when to generate a block acknowledgement message for said physical protocol data unit using said length value, and generate a block acknowledgement message using said estimate, said block acknowledgment message to include an individual acknowledgement value for each media access control protocol data unit, with each individual acknowledgement value to indicate whether a corresponding media access control protocol data unit has been received.

21. The article of claim 20, wherein the stored instructions, when executed by a processor, are further operable to monitor a first power level for said received physical protocol data unit, compare said first power level to a second power level, and estimate when to generate said block acknowledgement message in accordance with said comparison.

22. The article of claim 20, wherein the stored instructions, when executed by a processor, are further operable to send said block acknowledgement message during a delay interval to resend said physical protocol data unit.

23. The article of claim 20, wherein the stored instructions, when executed by a processor, are further operable to send said block acknowledgement message during a delay interval to resend said physical protocol data unit if a block acknowledgement request is not received during said delay interval.

24. The article of claim 23, wherein the stored instructions, when executed by a processor, are further operable to receive said block acknowledgement message, and resend at least one of said media access control protocol data units in accordance with said block acknowledgement message.

* * * * *

UNITED STATES PATENT AND TRADEMARK OFFICE
CERTIFICATE OF CORRECTION

PATENT NO. : 7,668,102 B2
APPLICATION NO. : 11/011208
DATED : February 23, 2010
INVENTOR(S) : Qinghua Li et al.

Page 1 of 1

It is certified that error appears in the above-identified patent and that said Letters Patent is hereby corrected as shown below:

In column 10, line 34, in Claim 3, delete "away" and insert -- array --, therefor.

In column 11, line 9, in Claim 10, delete "away" and insert -- array --, therefor.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,668,102 B2
APPLICATION NO. : 11/011208
DATED : February 23, 2010
INVENTOR(S) : Li et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1078 days.

Signed and Sealed this

Fourth Day of January, 2011

David J. Kappos
*Director of the United States Patent and Trademark Office*